United States Patent
Cappello et al.

(10) Patent No.: US 8,974,017 B2
(45) Date of Patent: Mar. 10, 2015

(54) INK-JET PRINTER FOR PRINTING ON CARDS

(75) Inventors: Paolo Cappello, Ivrea (IT); Mauro Mondino, Ivrea (IT)

(73) Assignee: SICPA Holding SA, Prilly (CH)

( * ) Notice: Subject to any disclaimer, the term of this patent is extended or adjusted under 35 U.S.C. 154(b) by 0 days.

(21) Appl. No.: 13/977,351

(22) PCT Filed: Dec. 28, 2011

(86) PCT No.: PCT/IB2011/055984
§ 371 (c)(1),
(2), (4) Date: Oct. 15, 2013

(87) PCT Pub. No.: WO2012/090164
PCT Pub. Date: Jul. 5, 2012

(65) Prior Publication Data
US 2014/0028745 A1 Jan. 30, 2014

(30) Foreign Application Priority Data
Dec. 30, 2010 (IT) .............................. MI2010A2480

(51) Int. Cl.
  *B41J 3/00* (2006.01)
  *B41J 2/01* (2006.01)
  *B41J 13/12* (2006.01)
  *B41J 13/00* (2006.01)
  *C09D 11/30* (2014.01)

(52) U.S. Cl.
  CPC .. *B41J 2/01* (2013.01); *B41J 13/12* (2013.01); *B41J 13/0009* (2013.01); *C09D 11/30* (2013.01)
  USPC ............................................................. 347/4

(58) Field of Classification Search
  USPC ......... 347/4, 6, 21, 85, 95, 96, 100, 101, 104, 347/106; 101/35, 40.1, 91, 93
  See application file for complete search history.

(56) References Cited

U.S. PATENT DOCUMENTS 6,182,566 B1   2/2001   Kubatzki et al.
6,478,485 B1   11/2002   Niestrath

FOREIGN PATENT DOCUMENTS

JP        2004058337 A      2/2004

OTHER PUBLICATIONS

International Search Report and Written Opinion issued in PCT/IB2011/055984 dated Mar. 28, 2012.
Australian Office Action conducted in counterpart Australian Appln. No. 2011350653 (Aug. 12, 2014).

*Primary Examiner* — Kristal Feggins
(74) *Attorney, Agent, or Firm* — Greenblum & Bernstein, P.L.C.

(57) ABSTRACT

An ink-jet printer includes a printing station for ink-jet printing on a thermoplastic card includes a printhead coupled to a reservoir containing an ink comprising: a medium of a low-boiling organic solvent, an auxiliary solvent of a high-boiling organic solvent, and a coloring component soluble in the medium. A support carriage supports the card and is drivable between a first position in which the carriage does not face the printhead and a second position in which the carriage faces the printhead. A driving motor moves the carriage between the first and second positions along a guide member interposed between the printhead and a reference member to prevent ink ejected by the printhead from reaching the reference member. A detection device mounted on the carriage detects the reference member and generates a signal used by a control unit to regulate the driving motor.

19 Claims, 6 Drawing Sheets

INK-JET PRINTER FOR PRINTING ON CARDS

CROSS-REFERENCE TO RELATED APPLICATIONS

This application is a U.S. National Stage Application of PCT/IB2011/055984, filed Dec. 28, 2011, claiming priority to Application No. MI2010A002480 filed Dec. 30, 2010.

BACKGROUND OF THE INVENTION

The present invention refers to an ink-jet printer for printing on cards.

In particular, the invention can be used for printing on cards made of plastic material such as, for example, credit cards, smart cards, magnetic cards, etc.

As known, these cards usually bear signs, images, trademarks, that help the users to identify the purpose of the card and to distinguish each card from the others.

In order to print on such cards, the Applicant has found that particular inks can be employed, that comprise: a medium consisting of a low-boiling organic solvent, an auxiliary solvent consisting of a high-boiling organic solvent, and a colouring component soluble in said medium.

The Applicant has also verified that these inks may be dangerous, due to their corrosive properties, for the electromechanical/electronic equipment of the printer. In particular, the printer can be provided with a support carriage, that is adapted to move the card to be printed within the same printer. In more detail, the carriage receives the card from a card storage zone, by means of an extraction station, and brings such card to a printing station, wherein the card is ink-jet printed. Then the carriage may also be used to take the card to an ejection station, where the card is moved away from the printer and received in a suitable container. The Applicant has noted that the portion of the printer that may be particularly subject to the corrosive action of the above described ink is the electromechanical/electronic equipment used for supporting and moving the card, i.e. the cited carriage and the device(s) active thereon for movement of the card.

SUMMARY OF THE INVENTION

In view of the above, it is an object of the present invention to provide an ink-jet printer for printing on cards that is capable of properly performing the printing operations without damaging parts of the same printer, and/or preventing a correct working thereof.

It is another object of the present invention to provide an ink-jet printer for printing on cards that is capable of moving the card to be printed, and ejecting ink on the same, without damaging the structure and/or compromising the correct working of the electromechanical/electronic equipment employed to move the card.

These and other objects are achieved by an ink-jet printer for printing on cards according to the claims appended hereto.

Further features and advantages will be apparent from the description of a non-exclusive and preferred embodiment of the invention.

BRIEF DESCRIPTION OF THE DRAWINGS

The description is provided for here below with reference to the attached drawings, wherein.

DETAILED DESCRIPTION OF THE INVENTION

Figure 1:
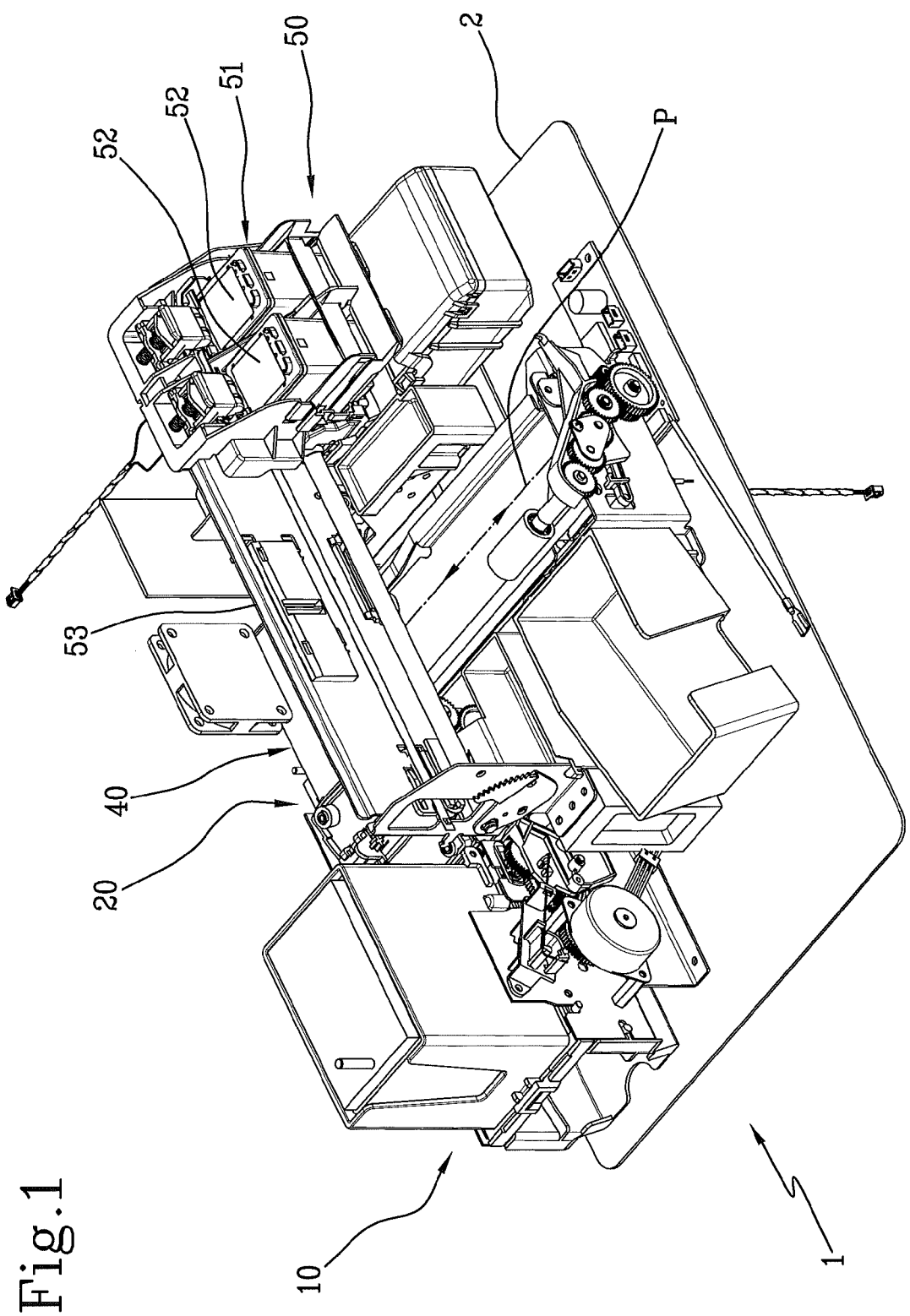
FIG. 1 is a schematic perspective view of a printer according to the invention.
Figure 2:
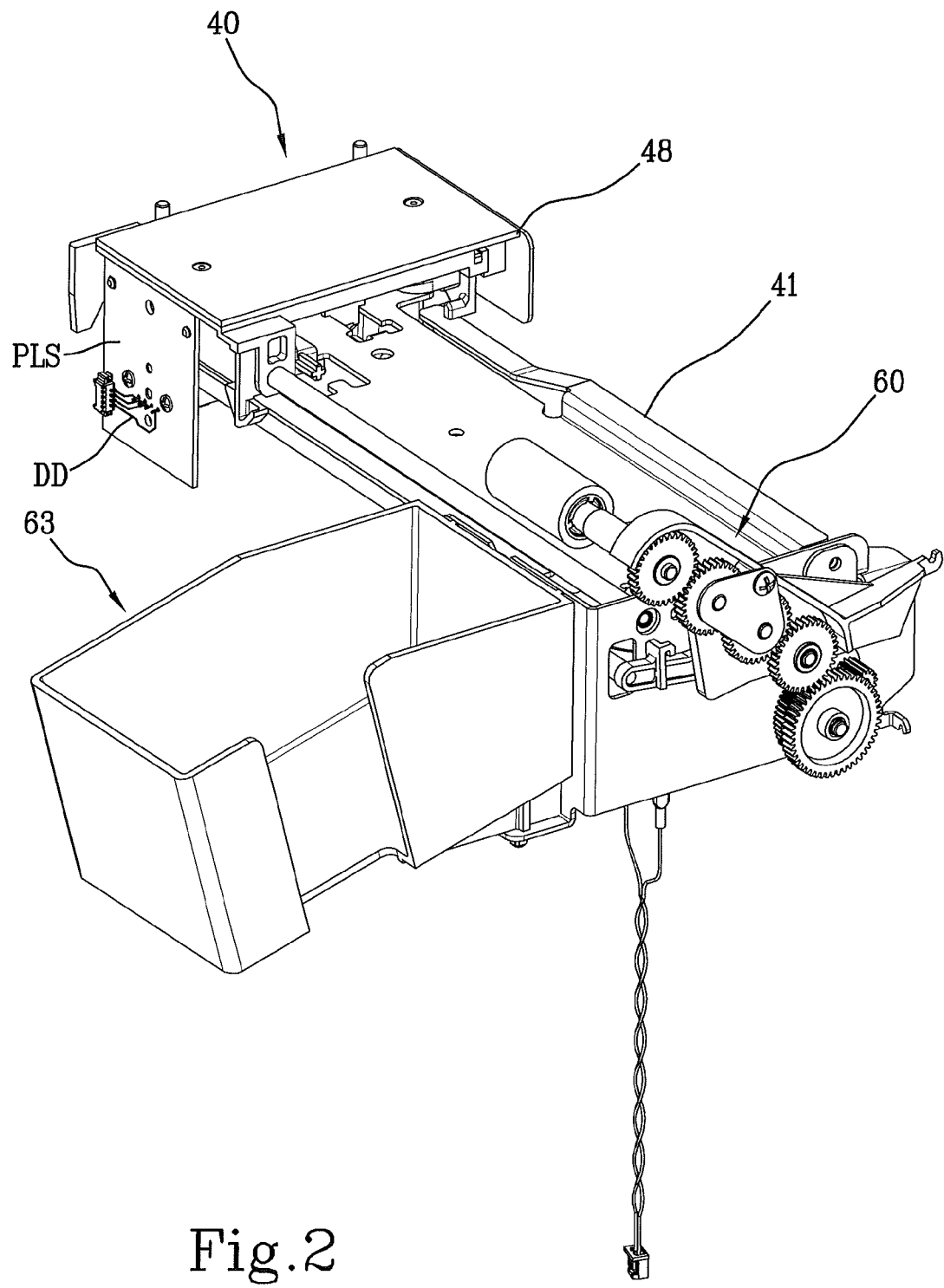
FIG. 2 is a schematic perspective view of a portion of the printer of FIG. 1.
Figure 3:
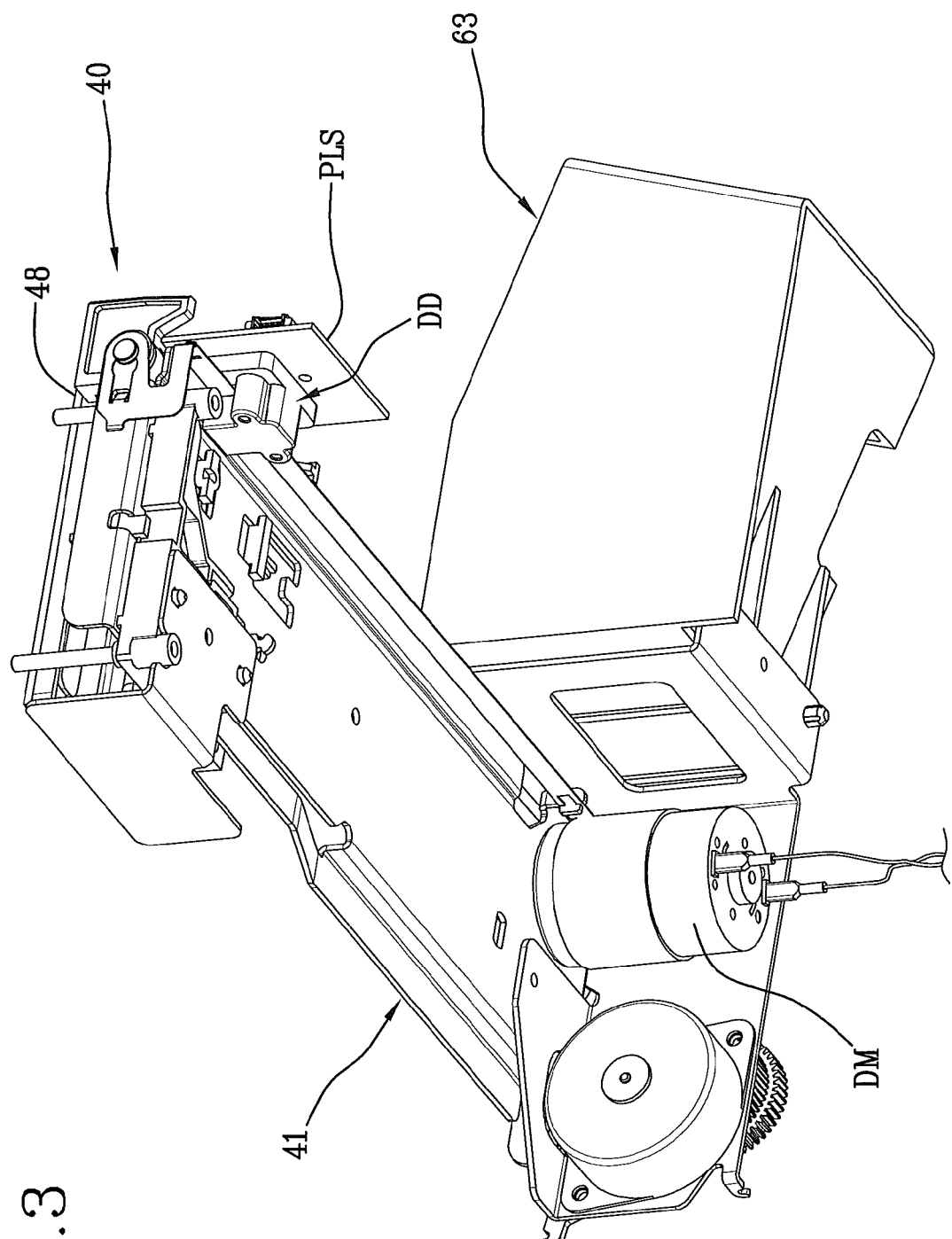
FIG. 3 is a different schematic perspective view of the portion of FIG. 2.

In the attached drawings, reference numeral 1 indicates the ink-jet printer according to the present invention.

The printer 1 is suitable for ink-jet printing on cards like credit cards, smart cards, magnetic cards, etc.

The printer 1 (FIG. 1) preferably comprises a storage zone 10 wherein one or more cards are stored.

Preferably the cards include, or are made of, a thermoplastic material.

In particular, the thermoplastic material can be selected in the group comprising: polyvinylchloride (PVC); polyvinylchloride (PVC) filled with mineral fillers; laminate polyvinylchloride (PVC); acrylonitrite-butadiene-styrene (ABS) terpolymers; polyethylenterephtalate (PET); glycol modified polyethylenterephtalate (PET-G); polylacticacid (PLA).

The laminate polyvinylchloride is formed by a central layer of polyvinylchloride filled with mineral fillers, and a couple of transparent polyvinylchloride films applied each on a respective surface of the central layer.

Preferably the cards have a substantially plate-like shape, having a substantially rectangular shape in a plant view; the rectangular shape has a larger side and a smaller side.

Preferably the larger side has a length comprised between 80 mm and 90 mm, and in particular substantially equal to 85.7 mm.

Preferably the smaller side has a length comprised between 50 mm and 60 mm, and in particular substantially equal to 54 mm.

Preferably the plate-like shape has a thickness comprised between 0.4 mm and 0.8 mm, and in particular between 0.5 mm and 0.76 mm.

Preferably the dimensions of the card are compliance with the ISO 7810 Standard and/or the CR80 Standard.

Preferably the printer 1 comprises an extraction station 20 or picking station adapted to extract a card 11 from the storage zone 10.

The extraction station 20 picks one card at a time from the storage zone 10 and places it on a support carriage 40.

Figure 4:
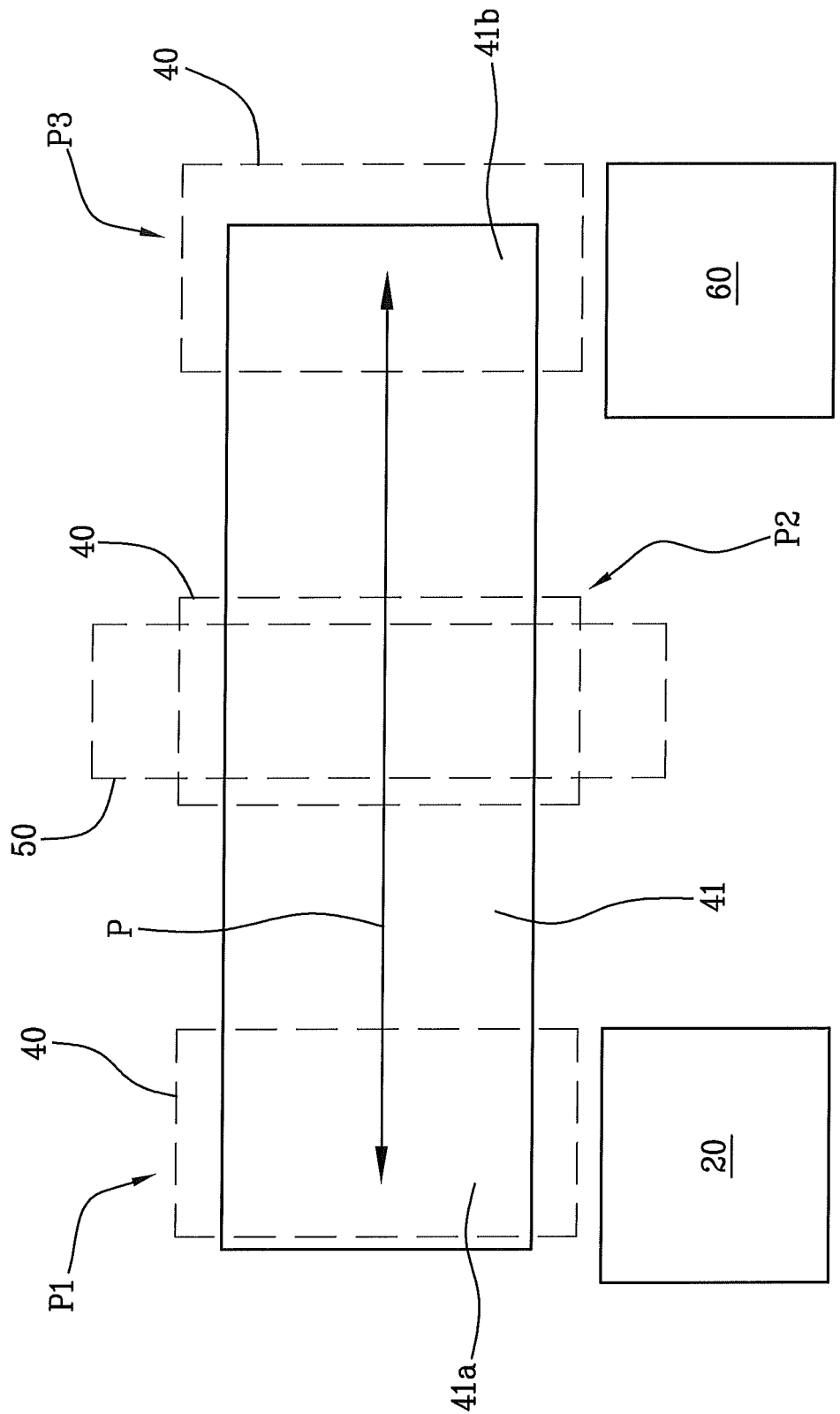
FIG. 4 is a schematic diagram showing possible operative configurations of the printer of claim 1.

The carriage 40 is drivable between at least a first position P1 and a second position P2 (FIG. 4).

In order to move between the first position P1 and the second position P2, the carriage 40 follows a path P.

Preferably the path P is substantially rectilinear.

Preferably, the first position P1 is close to the extraction station 20, so that the card can be properly transferred from the storage zone 10 to the carriage 40.

In the second position P2, the carriage 40 faces the printhead 51 of a printing station 50, that will be described in detail in the following.

When the carriage 40 is in its first position P1, it does not face the cited printhead 51, i.e. no printing steps are carried out when the carriage 40 is in such position.

The printing station 50 (FIG. 1) comprises at least one ink-jet printhead 51 for ink-jet printing on said card 11.

The printhead 51 is coupled to at least a reservoir 52 containing ink. Said ink comprises:
- a medium, or vehicle, consisting of a low-boiling organic solvent;
- an auxiliary solvent consisting of a high-boiling organic solvent;
- a colouring component soluble in said medium.

Preferably the vehicle has a boiling temperature lower than 120° C. and in particular lower than 80° C.

Preferably the vehicle is selected in the group of alcohols.

For example, the vehicle can be ethanol, n-propanol, n-butanol.

The vehicle has the tasks of dissolving the various components of the ink and sustaining the formation of the ink bubbles.

Preferably the auxiliary solvent has a boiling temperature higher than 120° C. and in particular higher than 150° C.

Preferably the auxiliary solvent is able to dissolve or to swell the plastic materials, and in particular the thermoplastic material of which the cards are made.

Preferably the auxiliary solvent is soluble in the vehicle.

For example, the auxiliary solvent can be selected in the group comprising: N-methyl-2-pyrrolidone, N-ethyl-2-pyrrolidone, 1,3-dimethyl-imidazolidinone, ε-caprolactone, γ_butyrolactone; glycol ethers like: ethylene glycol monomethyl ether, diethylene glycol monobutyl ether, triethylene glycol monomethyl ether, esters like: ethyl lactate, ethyl acetate; or mixtures thereof.

Preferably the colouring component is soluble in the vehicle.

In this context and in the following claims, the term "soluble" indicates solubility in the vehicle of at least 10% w/w.

Preferably, the colouring components belongs to the so called Solvent family according to the Colour Index terminology.

Preferably the colouring component is a substance that is capable of dissolving in the plastic material of which the cards are made, so as to become integral with the cards and to obtain an optimal printing.

For example, the colouring component can be selected in the group comprising: solvent black 29, solvent black 27; solvent blue 67, solvent blue 44, solvent blue 70; solvent yellow 82, solvent yellow 88; solvent red 125, solvent red 122.

Preferably, the ink also comprises one or more additives such as, for example, levelling agents, in order to improve the uniformity of the distribution of the ink on the cards.

For example, such additives can include silicon derivatives.

In the preferred embodiment schematically shown in FIG. 1, the printhead 51 is provided with two reservoirs 52.

The printing station 50 comprises a driving system (not shown) adapted to move the printhead 51 back and forth, along a preset path, so that the printhead 51 can eject ink on the card 11 during a sequence of steps regulated by a properly configured regulation unit.

Preferably the printhead 51 is slidably mounted on a support plate 53. In a preferred embodiment, the support plate 53 is transverse, and in particular perpendicular, to the path P of the carriage 40.

Preferably, the carriage 40 is guided by a guide member, typically a guide plate 41. In particular, the carriage 40 can be slidingly mounted on said guide plate 41.

Preferably the guide plate 41 has a first end 41a and a second end 41b, opposite to each other.

Preferably, the first position P1 of the carriage 40 is defined at the first end 41a of the guide plate 41.

In order to move the carriage 40 between its first and second positions P1, P2, the printer 1 comprises a driving motor DM.

Preferably, the driving motor DM is mounted to and integral with the frame 2 of the printer 1.

Preferably, the driving motor DM is mounted at an end 41a, 41b of the guide plate 41.

Figure 5:
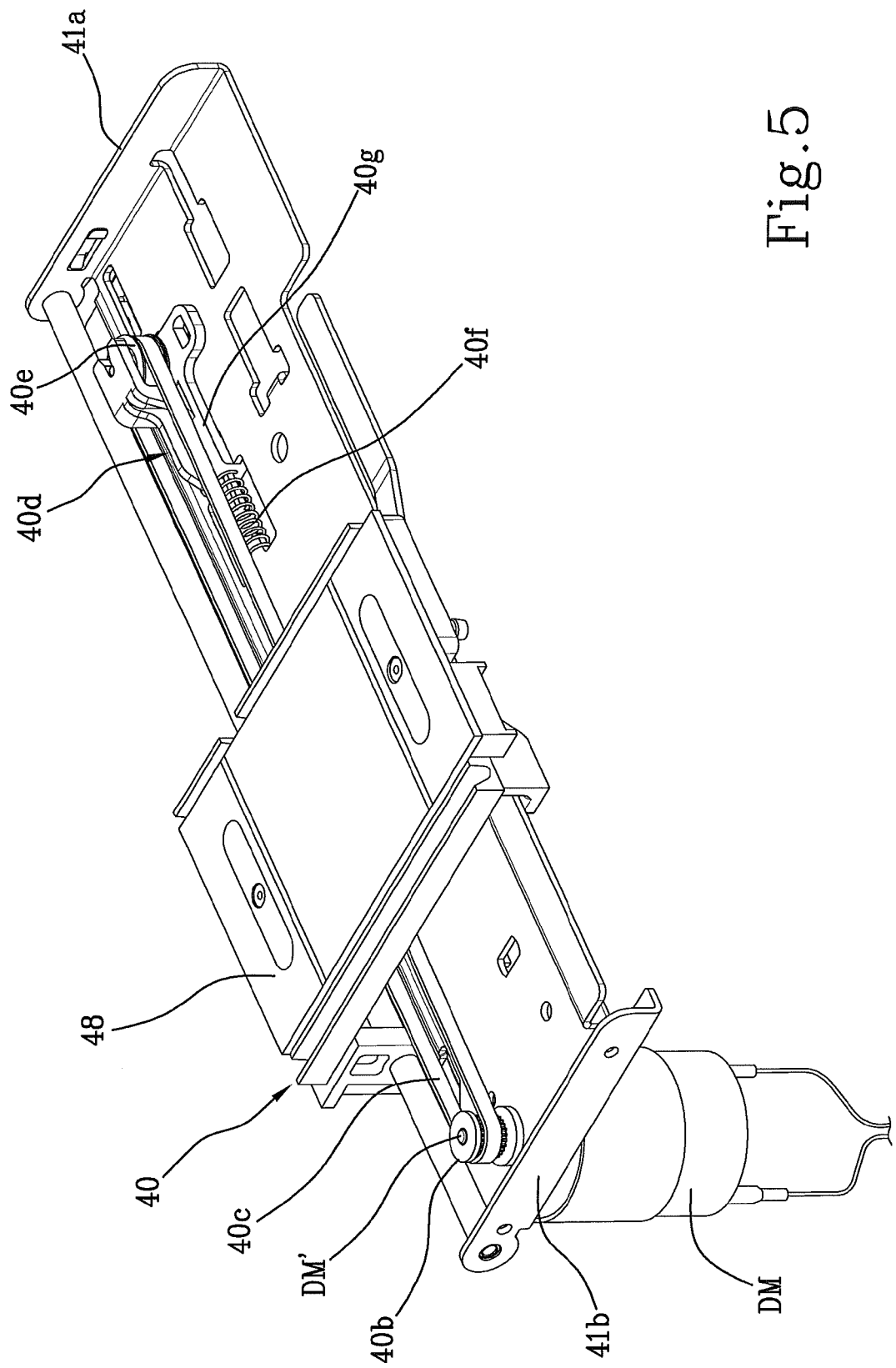
FIG. 5 is a schematic perspective view of a portion of the printer of FIG. 1.
Figure 6:
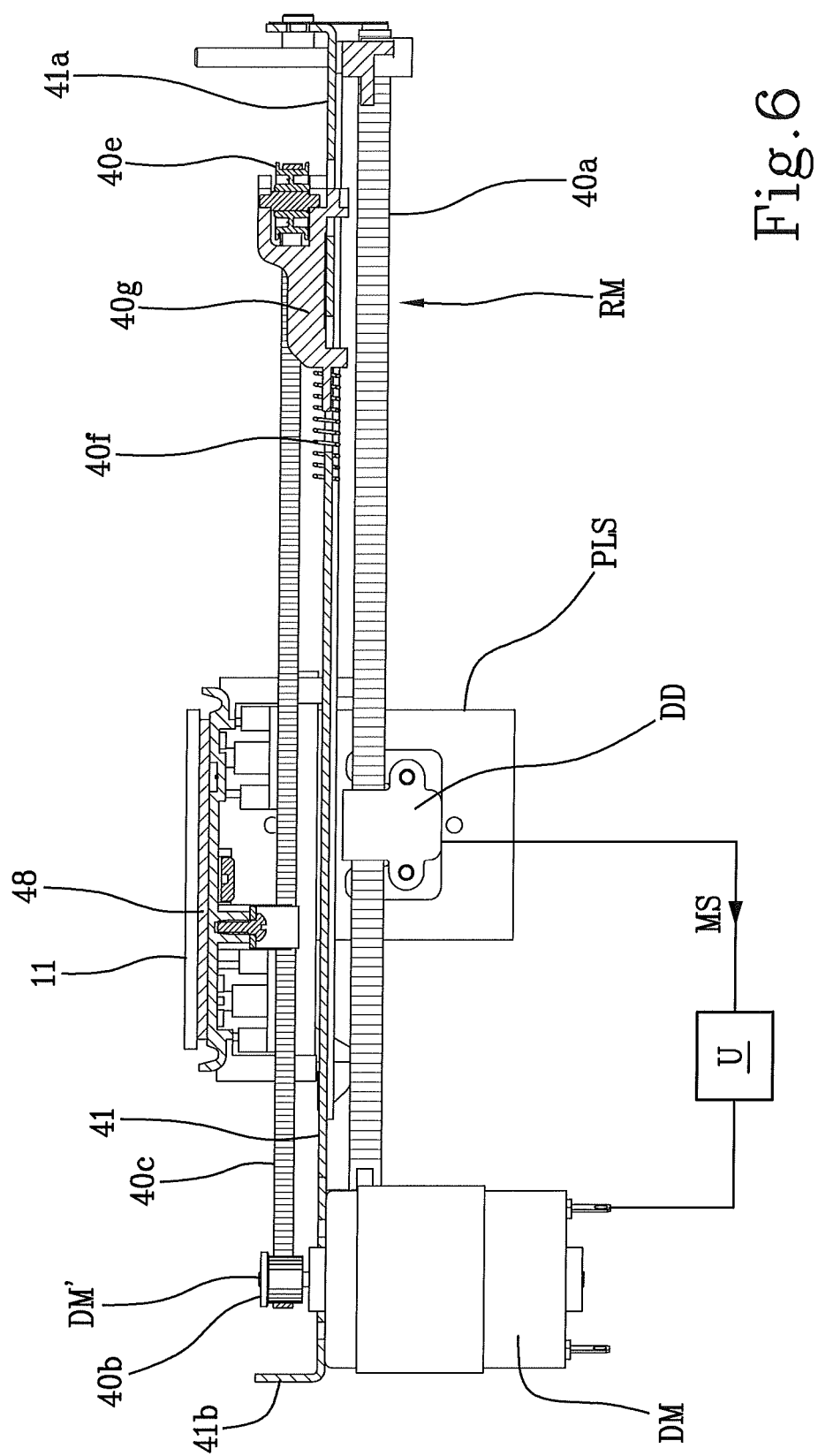
FIG. 6 is a partial cross-section of the printer portion of FIG. 5.

In the embodiment schematically shown in FIGS. 5 and 6, the driving motor DM is mounted at the second end 41b of the guide plate 41.

Preferably, the driving motor DM is connected to the carriage 40 by means of a mechanism comprising a main pulley 40b and a belt 40c. The pulley 40b is force fitted on the motor output shaft DM'. The belt 40c is engaged with the pulley 40b and fixed onto the carriage 40.

The carriage 40 is also subject to the action of a resilient member 40d, slidably mounted on the guide plate 41.

Preferably the resilient member 40d comprises an auxiliary pulley 40e and a spring 40f. The auxiliary pulley 40e is engaged with the belt 40c. The spring 40f has a first end engaged with the guide plate 41, and a second end, opposite to said first end, engaged with the auxiliary pulley 40e through a support member 40g.

The resilient member 40d acts along the movement direction of the carriage 40 (i.e. the direction of path P) and, in cooperation with the driving motor DM, contributes to the defining the movement of the carriage 40.

The printer 1 further comprises one or more reference members RM associated with the guide plate 41.

Preferably the one or more reference members comprise a graduated elongated element 40a arranged along the guide plate 41.

Preferably the elongated element 40a is made of a plastic material.

In the preferred embodiment, the graduated elongated element 40a is a graduated bar.

The graduation on the elongated element 40a can be realized by ink deposition and/or by deposition or removal of material.

For example, the graduation may consist of a plurality of signs, equidistant from each other. The distance between two consecutive signs can be comprised, for example, between 1/150" and 1/360".

Advantageously the guide plate 41 is interposed between the printhead 51 and the one or more reference members RM.

In practice, the one or more reference members RM are arranged so that the guide plate 41 prevents the ink ejected by the printhead 51 from reaching the same reference members RM.

It is to be noted that the reference members RM are shown in FIG. 6 for clarity reasons only: the reference members, in fact, can be preferably arranged so as to be visible from a point of view opposite to the one used in FIG. 6. More specifically, the graduation on the graduated bar 40a can be provided on the opposite side of such bar with respect to the one shown in FIG. 6.

The printer 1 further comprises a detection device DD mounted on the carriage 40 (FIGS. 2, 3, 5 and 6).

The detection device DD is adapted to detect the one or more reference members RM and to generate a corresponding main signal MS. Preferably, the main signal MS is an electric signal.

In particular, the detection device DD is adapted to detect the graduation provided on the elongated element 40a.

Preferably the detection device DD comprises an optical detector.

The main signal MS is transmitted to a control unit U, that is configured for regulating the driving motor DM, and consequently the movement of the carriage 40, according to the main signal MS.

In practice, by means of the cooperation between the detection device DD and the one or more reference member RM, it is possible to know the current position of the carriage 40. As a function of such current position, the control unit U regulates the driving motor M, so that the carriage 40 can be positioned in the position required by the step to be executed in the process carried out by the printer 1.

In one embodiment, the main signal MS can comprise a simple notification for each sign that is detected by the detection device DD.

The control unit U, by processing such notification, can determine the current position of the carriage 40 and control the driving motor DM accordingly.

In another embodiment, the detection device DD is adapted to determine autonomously the position of the carriage 40, as a function of the detected signs. In this case, the main signal MS is directly representative of the current position of the carriage 40, and the control unit U does not have to perform substantial additional processing for determining the position of the carriage 40.

Preferably the carriage 40 comprises a plate-like element 48 on which the card 11 is located (FIGS. 2, 3, 5 and 6).

Preferably the plate-like element 48 is substantially parallel to the guide plate 41, at least when the carriage is in its second position P2.

Preferably, the plate like-element 48 has a shape, in a plant view, similar to that of the card 11.

For example, the plate like-element 48 can have a substantially rectangular shape, having a larger side comprised between 75 mm and 85 mm, and in particular substantially equal to 80 mm, and a smaller side comprised between 45 mm and 55 mm, and in particular substantially equal to 50 mm.

It is to be noted that the card 11 is preferably larger than the plate-like element 48. Accordingly, the ink ejected by the printhead 51 does not reach the plate-like element 48, since the latter is shielded by the card 11. This feature achieves an advantage in that the plate-like element 48 can be, in practice, a printed circuit board (PCB) including heating means for heating the card 11, that would be damaged by an interaction with the ink ejected by the printhead 51.

Preferably the carriage 40 comprises a plate-like support PLS mounted at an end of the plate-like element 48.

In particular, in case the plate-like element 48 has a rectangular shape, the plate-like support PLS is mounted at one of the shorter sides of such rectangular shape.

Preferably the plate-like support PLS is transverse, and more preferably perpendicular, to the plate-like element 48.

Preferably the plate-like support PLS is substantially parallel to the movement direction of the carriage 40, i.e. to the direction of the path P.

In practice, the plate-like element 48 and the plate-like support PLS form an "L"-shaped structure included in said carriage 40.

Preferably the detection device DD is mounted on said plate-like support PLS. In a preferred embodiment, the plate-like support PLS is the board (PCB) on which the circuit containing the detection device DD is arranged.

Preferably, the carriage 40 is also movable in a third position P3 (FIG. 4). The third position P3 is substantially at the second end 41b of the guide plate 51. Thus, the second position P2 is preferably interposed between the first position P1 and the third position P3 along the path P.

When the carriage 40 is in the third position P3, the card 11 can be subject to the action of an ejection station 60. The ejection station is configured to move the card 11 away from the carriage 40 and, preferably, to make it land into a container 63.

The invention achieves important advantages.

In fact the printer according to the invention is capable of properly performing the printing operations without damaging parts of the same printer, and/or preventing a correct working thereof.

Another advantage consists in that the printer according to the invention is capable of moving the card to be printed, and ejecting ink on the same, without damaging the structure and/or compromising the correct working of the electromechanical/electronic equipment employed to move the card.

In the printer of the present invention the elongated element 40a is a graduated bar.

In the printer of the present invention the larger side has a length comprised between 80 mm and 90 mm.

The smaller side has a length comprised between 50 mm and 60 mm.

In the printer of the present invention the plate-like shape has a thickness comprised between 0.4 mm and 0.8 mm, and in particular between 0.5 mm and 0.76 mm.

The invention claimed is:

1. An ink-jet printer for printing on cards, comprising:
    a printing station for ink-jet printing on a card made of thermoplastic material, said printing station including at least a printhead and a reservoir coupled to the printhead and containing an ink comprising: a medium consisting of a low-boiling organic solvent, an auxiliary solvent consisting of a high-boiling organic solvent, and a coloring component soluble in said medium;
    a support carriage adapted to support said card, said carriage being drivable between a first position in which said carriage does not face said printhead and a second position in which said carriage faces said printhead;
    a driving motor active on said carriage for moving the said carriage between said first and second positions;
    a guide member for said carriage, the carriage being movable along said guide member between said first and second positions;
    one or more reference members associated with said guide member, the guide member being interposed between said printhead and said one or more reference members to prevent ink ejected by the printhead from reaching the reference member;
    a detection device mounted on said carriage, said detection device being adapted to detect said one or more reference members and generate a corresponding main signal; and
    a control unit, connected with said detection device for receiving said main signal and regulating said driving motor according to said main signal.

2. The ink-jet printer according to claim 1, wherein said one or more reference members comprise a graduated elongated element arranged along said guide member, said detection device being adapted to detect the graduation provided on said elongated element.

3. The ink-jet printer according to claim 1, wherein said carriage is slidingly mounted on said guide member.

4. The ink-jet printer according to claim 1, wherein said carriage comprises an element having a plate shape on which the card is located.

5. The ink-jet printer according to claim 4, wherein said plate-shaped element is substantially parallel to said guide member at least when the carriage is its second position.

6. The ink-jet printer according to claim 5, wherein said detection device is mounted on a support having a plate shape mounted at end of said plate-shaped element.

7. The ink-jet printer according to claim 6, wherein said plate-shaped support is transverse, and preferably perpendicular, to said plate shaped element.

8. The ink-jet printer according to claim 7, wherein said plate shaped support is substantially parallel to a movement direction of said carriage.

9. The ink-jet printer according to claim 1, forming a combination with the card, wherein said card includes a thermoplastic material.

10. The ink-jet printer according to claim 9, wherein said thermoplastic material is selected from the group comprising: polyvinylchloride; polyvinylchloride filled with mineral fillers; laminate polyvinylchloride; acrylonitrite butadiene styrene terpolymers; polyethylenterephtalate; polylacticacid.

11. The ink-jet printer according to claim 1, wherein said card has a shape substantially of a rectangular plate in a plan view, with a larger side and a smaller side.

12. The ink-jet printer according to claim 1, wherein said medium has a boiling temperature lower than 120.degree. C.

13. The ink-jet printer according to claim 1, wherein said medium is selected from the group of alcohols.

14. The ink-jet printer according to claim 1, wherein said auxiliary solvent has a boiling temperature higher than 120.degree. C.

15. The ink-jet printer according to claim 1, wherein said auxiliary solvent is compatible with plastic materials.

16. An ink-jet printer for printing on cards, comprising:
a printing station for ink-jet printing on a card made of thermoplastic material, said printing station including at least a printhead and a reservoir coupled to the printhead and containing an ink;
a support carriage adapted to support said card, said carriage being drivable between a first position in which said carriage does not face said printhead and a second position in which said carriage faces said printhead;
a driving motor active on said carriage for moving the said carriage between said first and second positions;
a guide member for said carriage, the carriage being movable along said guide member between said first and second positions;
one or more reference members associated with said guide member, the guide member being interposed between said printhead and said one or more reference members to prevent ink ejected by the printhead from reaching the reference member;
a detection device mounted on said carriage, said detection device being adapted to detect said one or more reference members and generate a corresponding main signal; and
a control unit, connected with said detection device for receiving said main signal and regulating said driving motor according to said main signal.

17. The ink-jet printer according to claim 16, wherein, with regard to the printhead, at least a part of the detection device is covered by the guide member.

18. The ink-jet printer according to claim 16, wherein, with regard to the printhead, the one or more reference members are coupled to an underside of the guide member.

19. The ink-jet printer according to claim 16, wherein the ink contained in the reservoir comprises: a medium comprising a low-boiling organic solvent, an auxiliary solvent comprising a high-boiling organic solvent, and a coloring component soluble in said medium.

* * * * *

UNITED STATES PATENT AND TRADEMARK OFFICE
CERTIFICATE OF CORRECTION

PATENT NO. : 8,974,017 B2  
APPLICATION NO. : 13/977351  
DATED : March 10, 2015  
INVENTOR(S) : Paolo Cappello et al.

Page 1 of 1

It is certified that error appears in the above-identified patent and that said Letters Patent is hereby corrected as shown below:

Title page, Item (73) Assignee, of the printed patent, "SICPA Holding SA" should read --SICPA HOLDING SA--.

Signed and Sealed this
Third Day of November, 2015

Michelle K. Lee
*Director of the United States Patent and Trademark Office*